Figure 1:
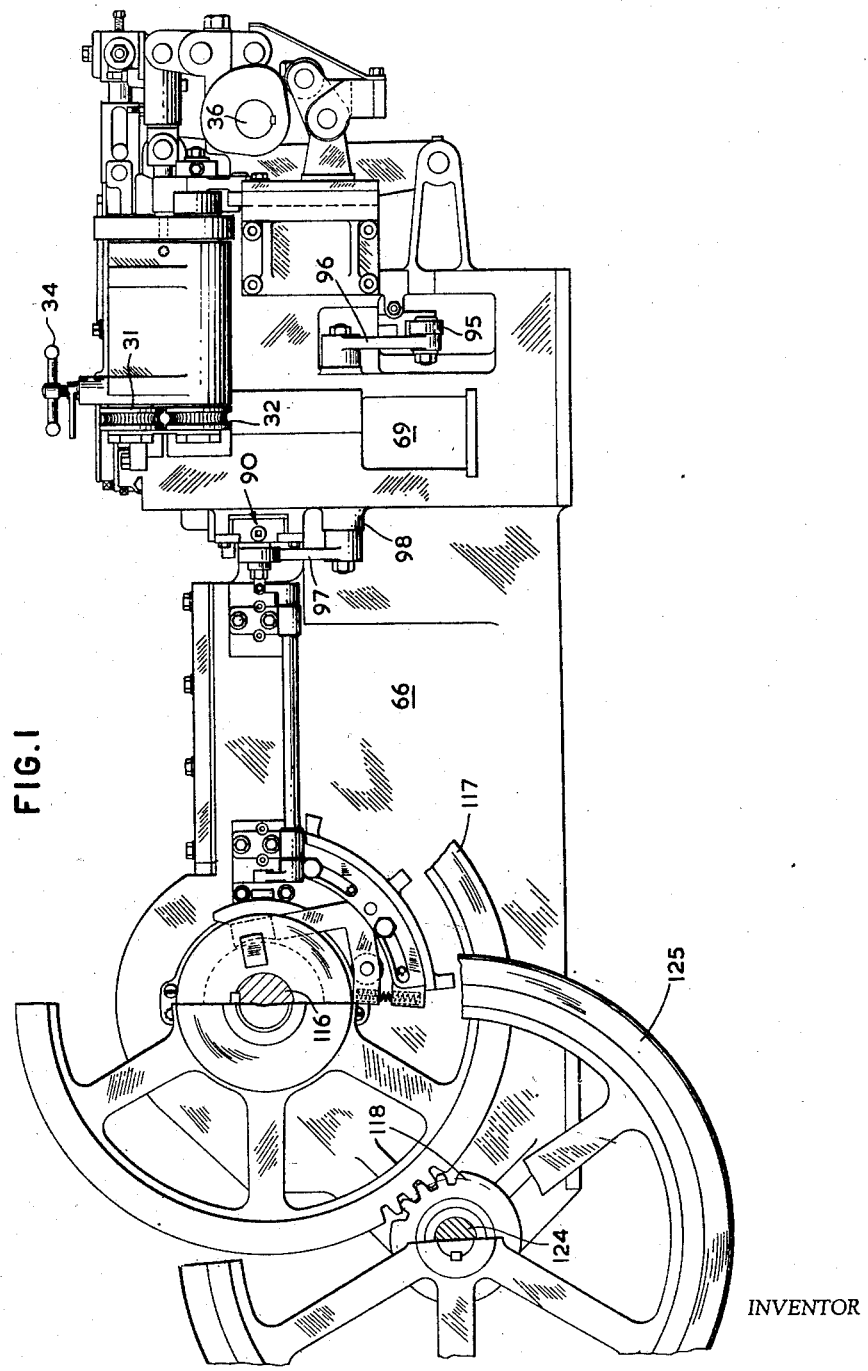

Jan. 11, 1955   A. VAN HAANDEL   2,698,951
PROCESS FOR FORMING METALLIC ARTICLES
Filed Jan. 26, 1949   8 Sheets-Sheet 1

INVENTOR
Adrianus van Haandel
BY
Pennie, Edmonds, Morton, Barrows & Taylor
ATTORNEYS

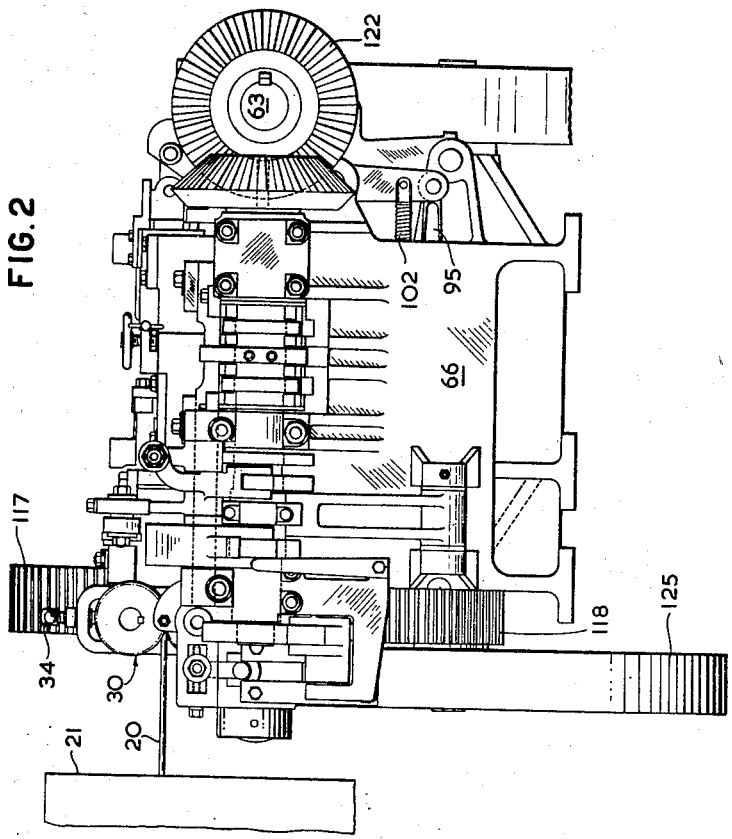

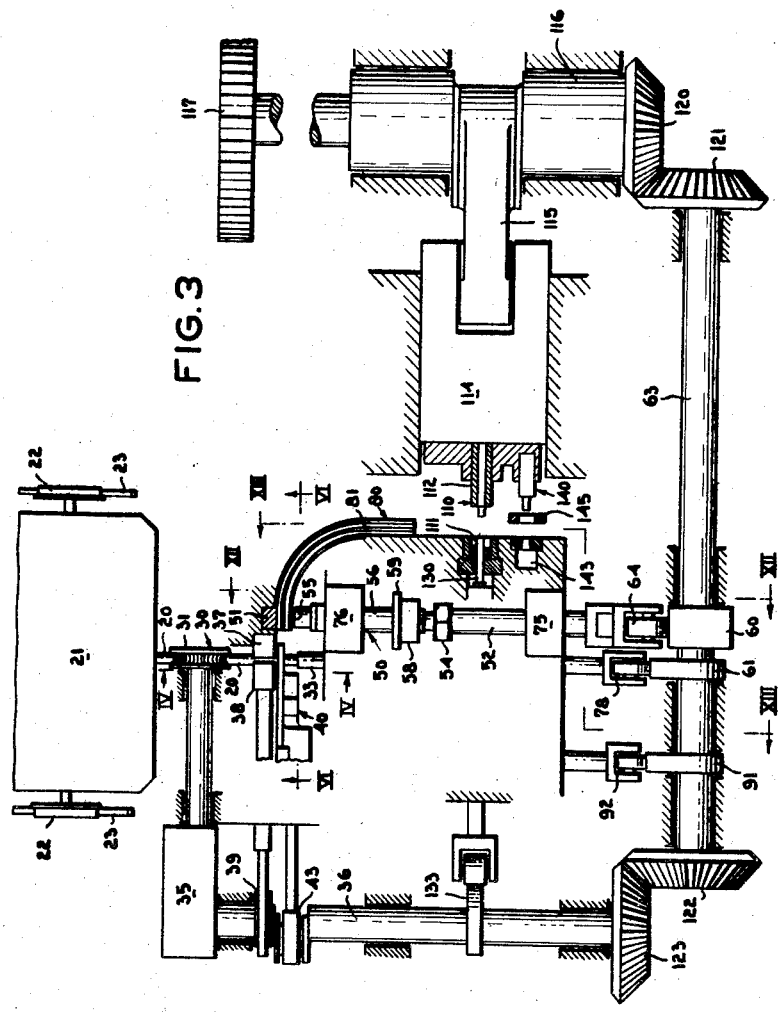

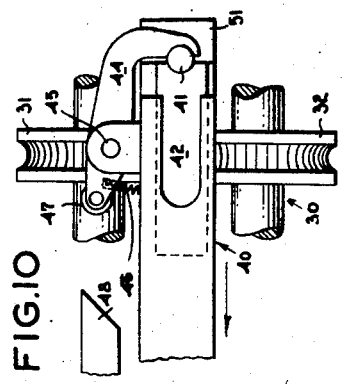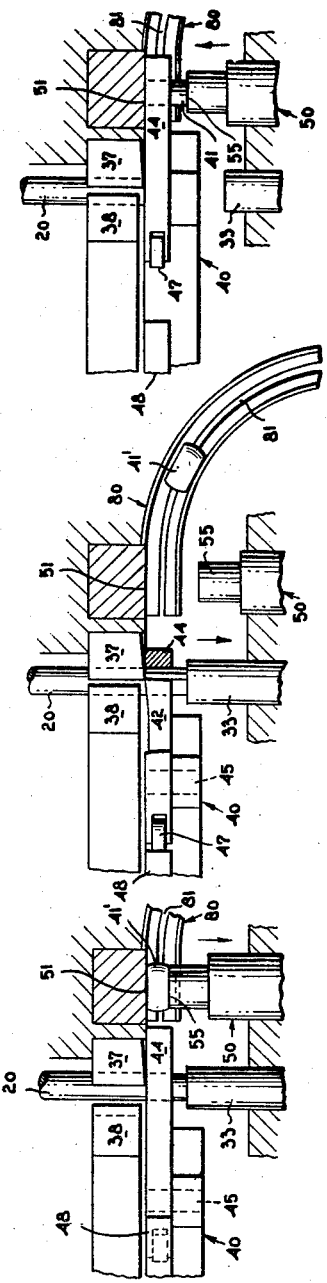

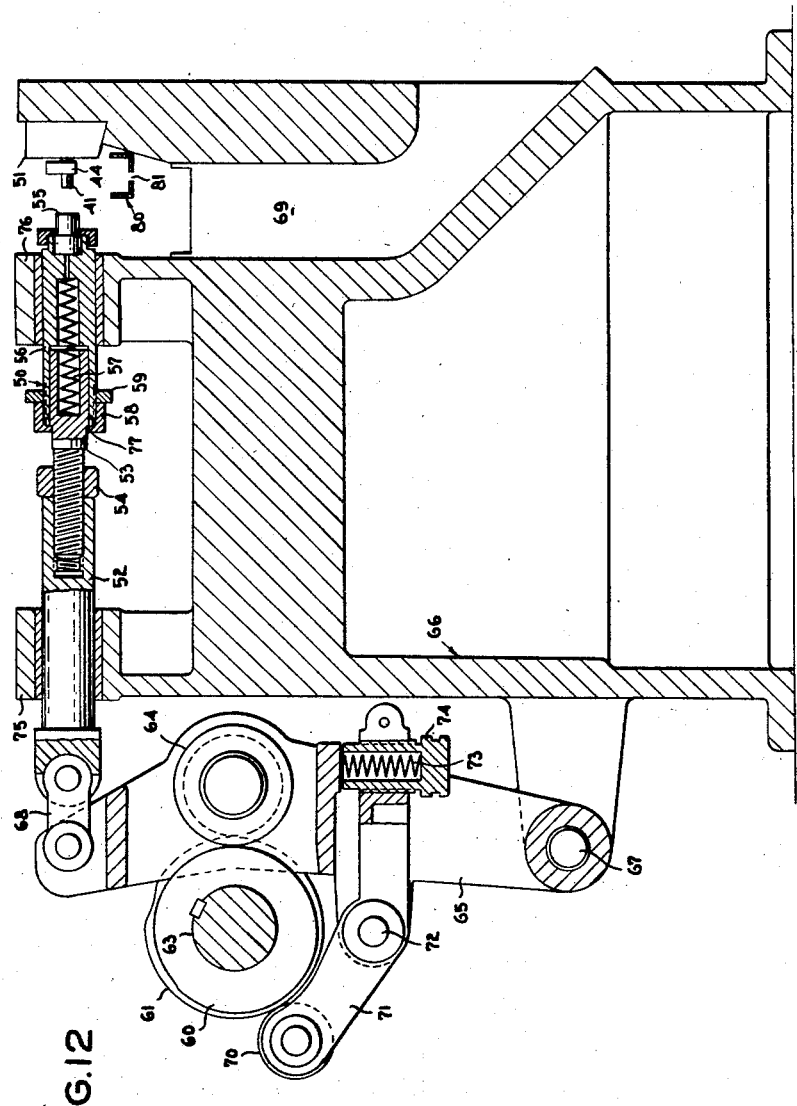

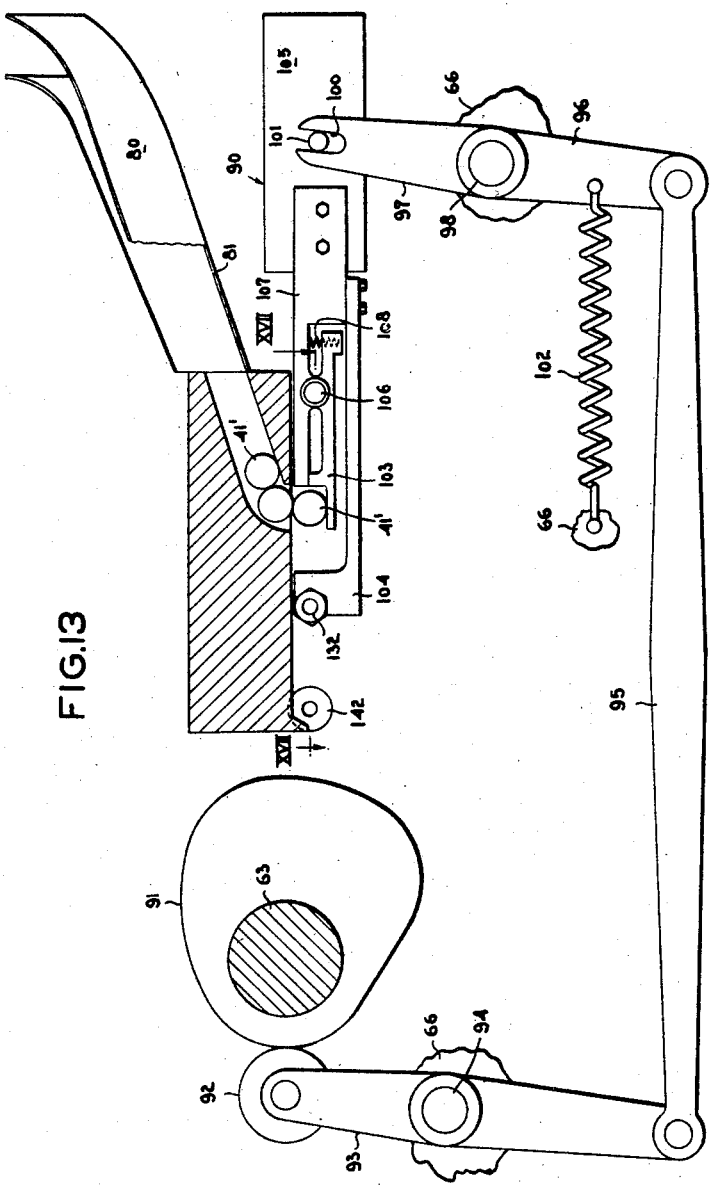

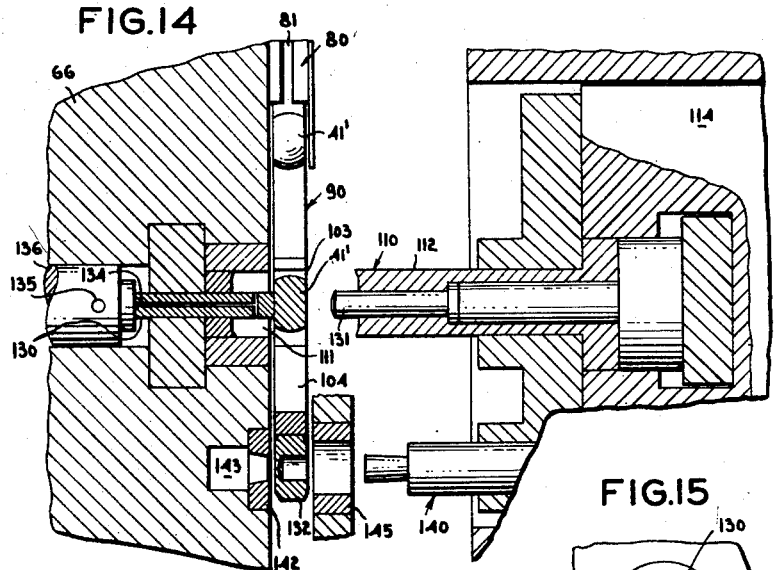

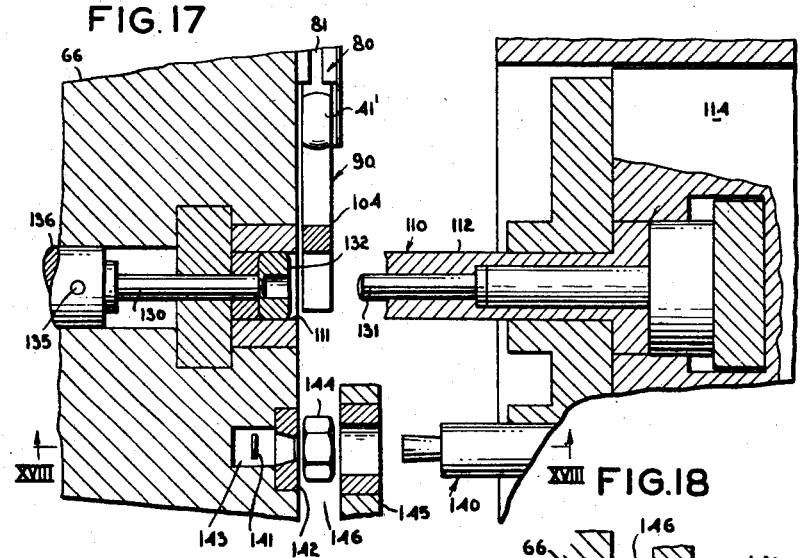
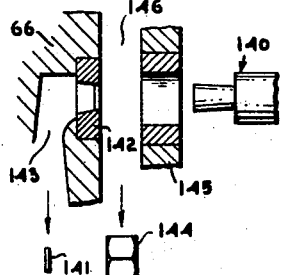
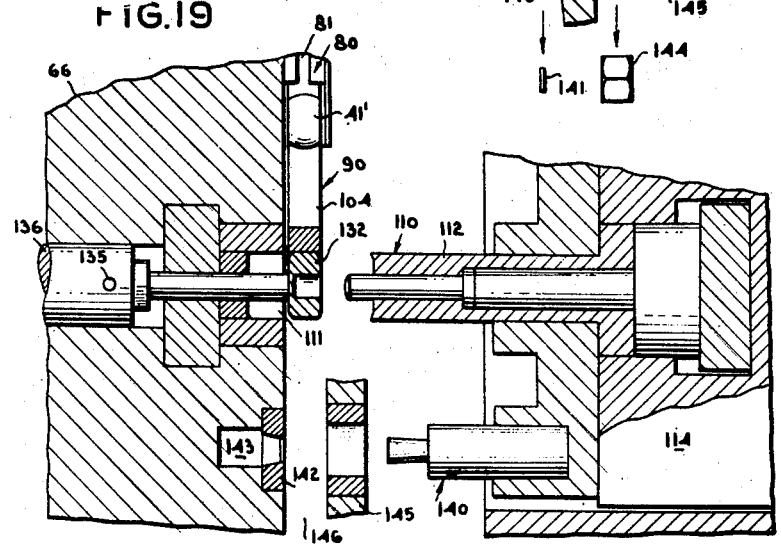

United States Patent Office 2,698,951
Patented Jan. 11, 1955

2,698,951

PROCESS FOR FORMING METALLIC ARTICLES

Adrianus van Haandel, Helmond, Netherlands, assignor, by mesne assignments, to Nedschroef Octrooi Maatschappij, N. V., Helmond, Netherlands, a company Application January 26, 1949, Serial No. 72,983

Claims priority, application Netherlands May 15, 1948

11 Claims. (Cl. 10—86)

This invention relates to a system for producing definitely shaped metallic articles by pressure when their metallic mass is plastic. More particularly, it deals with a new method and apparatus for continuously forming metallic articles, such as nuts, bolts, rivets, washers, sleeves, collars, and similar metal ring-shaped, polygonal and other articles, from bar or strip stock which is heated until plastic, and then forming the desired articles, under pressure in dies, from slugs cut from such stock.

There are two general methods of so producing such articles; one is the cold method, which requires a large, complicated and heavy machine performing many operations to form the desired article from strip or bar stock which is cold and not very plastic; and the other is the hot method, in which the stock or slug from which the desired article is formed, is heated to red heat so that it will be more plastic and can be formed and shaped in dies in fewer operations and by smaller machines which are not so complicated or heavy. In both methods the dies in the machines are subject to great wear; in the cold method because of the relatively small amount of plasticity of the metal being worked, and in the hot method because of the hard oxide and other scale which always forms on the surface of the hot slugs being deformed in the dies. Accordingly, the dies must be replaced from time to time which is a material item of expense as well as a loss of time for operating the machine. Furthermore in the hot method the presence of scale on the finished article requires after treatment for its removal.

It is an object of this invention to produce a new, efficient, economic, and effective hot method and apparatus for producing such pressure formed metallic articles.

Another object of this invention is to present a method for producing articles by the hot method in which the amount of undesirable scale on the slugs to be deformed in the die or dies is materially reduced, thereby increasing the life of the dies as well as increasing the uniformity, toughness, strength, sharpness of the edges and smoothness of the final products, which as a result require fewer after treatment operations, such as polishing and the like.

Another object of this invention is to produce a method and apparatus which may use stock metal bars or strips having cross sectional tolerances ranging as great as one millimeter to produce uniformly sized and closely gauged products so that the same gauge stock may be used for making both nuts and their corresponding bolts if desired.

Another object is to produce a comparatively light and compact machine for carrying out this new method, which machine is easy to operate, does not consume much power, and may be operated more rapidly than prior machines, thereby increasing the number of articles which may be produced in a given limit of time.

Another object is to produce such an apparatus which is easily and in many different ways adjustable so that it may be adapted readily for the production of a large variety of different shaped articles.

In accordance with this invention, the method comprises the new and additional step or steps of removing the scale from the hot plastic metallic slugs before they are pressed in the shaping or forming die or dies. This is accomplished by pre-pressing or squeezing the hot slugs, after they have been cut from the bar or strip of stock, between two surfaces to expand the other and exposed surfaces of the slugs to crack off the scale formed on them, and then may also include the step of permitting the slugs to drop of their own weight along a bent or crooked path to knock off against the sides of said path any other scale which may be still clinging to the slugs before the slugs are fed into the forming die or dies.

This pre-pressing or squeezing operation or step is preferably carried out only to a degree sufficient to crack and remove the scale on the slug and not to increase the dimensions of the slug to such a degree that it will not easily fit into the forming and shaping die. Thus, no material is cut from the outside edges of the squeezed slug by the die increasing the loss of material. This is accomplished by cutting slugs and using stock of sufficiently small dimensions so that the slugs may be deformed by the squeezing operation sufficient to crack off the scale, without becoming too flat or big around to fit into the first forming die. This squeezing operation, the degree of which may be adjusted, permits the use of a wider tolerance of starting stock or material, in that the slug is, in effect, slightly reshaped to the desired dimensions before being placed in the final shaping or forming dies.

The production of the desired articles may comprise a furnace or heater for the stock to be pressed into the desired shape and a unitary machine or plurality of machines for performing one or more or all of the following operations:

(1) Feeding the stock from the furnace into a cutting machine, (2) Means to cut slugs from said hot stock, (3) Means to pre-press or squeeze the slugs to remove the scale, (4) A trough or chute, which is preferably not straight, through which the squeezed slugs pass to knock off more scale, (5) Means to feed the scale-free slugs to the shaping or forming die, and (6) Means to press the slugs in said die or dies to form the desired articles which in the case of nuts, for example, may include also means to punch the center holes therein.

The above mentioned and other features and objects of this invention and the manner of attaining them will become more apparent and the invention itself will be best understood by reference to the following description of an embodiment of the invention taken in conjunction with the accompanying drawings, in which:

Fig. 1 is a side elevation with parts of the driving wheels broken away, of one embodiment of a machine involving this invention as seen from the furnace or hot stock feeding side, Fig. 2 is a view of the right end of the machine shown in Fig. 1, also showing a part of the furnace, Fig. 3 is a schematic plan view partly in section of the machine in Figs. 1 and 2 showing the different locations where the operations are carried out for producing a ring-shaped article, such as a hexagonal nut, from hot round bar stock, Fig. 4 is a side elevation of the feeding mechanism taken along line IV—IV in Fig. 3, Fig. 5 is an end view of the feeding mechanism taken along line V—V in Fig. 4, Fig. 6 is a side view of the cutting off mechanism, shown in its first position, and a part of the squeezing mechanism, taken along line VI—VI in Fig. 3, Fig. 7 is a plan view of the cutting and squeezing mechanisms shown in the position of Fig. 6, Fig. 8 is similar to Fig. 6 with the mechanisms in their second position, Fig. 9 is a plan view of Fig. 8, Fig. 10 is similar to Fig. 6 with the mechanisms in their third position, Fig. 11 is a plan view of Fig. 10, Fig. 12 is a vertical sectional view, with unrelated parts omitted, of the squeezing mechanism taken along lines XII—XII in Figs. 1 and 3, Fig. 13 is a schematic view of the die or press feeding mechanism, with unrelated parts omitted, taken along line XIII—XIII in Figs. 1 and 3, Fig. 14 is a horizontal sectional view, with parts broken away, of the nut forming and punching mechanisms in their first position, Fig. 15 is a front view of the hexagonal nut forming die shown in section in Fig. 14, Fig. 16 is similar to Fig. 14 showing the mechanisms in their second position, Fig. 17 is similar to Fig. 14 showing the mechanisms in their third position, which corresponds to the position taken along line XVII—XVII in Fig. 13, Fig. 18 is a vertical section through the center of the hole punching mechanism along line XVIII—XVIII shown in Fig. 17, and Fig. 19 is similar to Fig. 14 showing the mechanisms in their fourth position.

Referring to Figs. 1 and 2, there is shown the exterior of one compact machine for feeding, cutting, squeezing, and then shaping or forming nuts or similar articles from bar stock. The bar stock 20 is first heated in a furnace 21 (See Figs. 2, 3 and 4) to a temperature at which the metal in the bar becomes plastic, say red-hot, i. e. between about 900° and 1100° C. or at about 1000° C. The furnace 21 is shown mounted on wheels 22 which roll on a track 23, so that it may be easily moved away from the machine when it is necessary to make adjustments, change the dies to make other parts or articles, or repair the machine.

The red-hot bar stock 20 is intermittently drawn from the furnace 21 by the feeding mechanism 30 (see Figs. 3, 4 and 5) mounted on the machine and operated in synchronism therewith. This feeding mechanism is shown to comprise a pair of roughened grooved rollers 31 and 32 between the adjacent grooves of which the bar 20 is frictionally gripped so that when these rollers are rotated a fraction of a turn they will feed a predetermined length of the bar of stock into the machine until its end abuts against a retractable stop 33 (see Figs. 3, 4, 7, 9 and 11). The axial distance between the two feeding rollers 31 and 32 may be adjusted by means of the hand screw 34, and these rollers are intermittently driven through a mechanism 35 from cam shaft 36. As soon as the end of the hot bar 20 contacts the projecting abutment 33 (see Figs. 4 and 7), the hot bar is clamped into position against the stationary jaw 37 by a movable jaw 38, operated by cam 39 on shaft 36 (see Figs. 3 and 5).

When the end of the hot bar is firmly clamped, the cutting or shearing mechanism 40 operates to cut off the end of the hot bar between the jaws 37 and 38 and the abutment 33 to form a cylindrical slug 41 (see Figs. 10 and 11) which is simultaneously carried into position for being pre-pressed or squeezed to break off the scale on its cylindrical surface which accumulated while the bar from which it was cut was being heated in the furnace 21. This cutting mechanism 40 comprises a replaceable knife 42 the edge of which cooperates with the overhanging edge of the stationary jaw 37 to make a clean transverse cut through the bar 20 (see Fig. 9). As the cutting mechanism is moved to the right to cut off the slug 41, actuated by a cam 43 on the cam shaft 36, a pivoted jaw 44, pivotally mounted at 45 on the moving cutting mechanism, is urged into the position shown in Fig. 8 by spring 46 to hold the slug 41 against the face of the knife 42 while it is being cut off and transported into the position for being squeezed. The pivoted jaw 44 is held out of its clamping position in the first position shown in Figs. 6 and 7 against the action of the spring 46, by means of the roller 47 which rests against the stationary cam surface 48. Simultaneously with the motion of the cutting mechanism to the right, the abutment 33 is withdrawn from the position shown in Fig. 9 to its retracted position shown in Fig. 11 so that this abutment will not hinder the motion of mechanism 40. As soon as the slug 41 is moved into the position for being squeezed or pre-pressed shown in Figs. 10 and 11, the pre-pressing, upsetting or squeezing mechanism 50 is extended to clamp the slug 41 between its two freshly cut end surfaces and against stationary surface 51, so that when the cutting mechanism 40 is withdrawn to the left into the position shown in Figs. 6 and 7, the pivoted jaw 44 will pivot against the action of the spring 46 and slide over the top of the clamped slug 41.

The operation of the squeezing mechanism 50 can best be described in connection with Fig. 12 which is a vertical sectional view of the essential parts of this mechanism. The reciprocating motion of the mechanism 50 is effected by two parallel cams 60 and 61 mounted on cam shaft 63. Cam 61 is followed by a roller 64 mounted on an arm 65 pivoted at one end to the frame 66 of the machine at 67, and connected by a link 68 to the longitudinally adjustable squeezing mechanism 50. This mechanism comprises interthreaded cylindrical pieces 52 and 53 to adjust the length of the mechanism 50 which length is secured by a locknut 54. Piece 53 is connected to the replaceable pressing surface 55 by a hollow piece 56 inside of which is located a compression spring 57, the compression of which may be adjusted by the screw cap 58 and its lock-nut 59. The action of the mechanism 50 is so synchronized that only the compression of the spring 57 pushing between the pieces 53 and 56 holds the slug 41 between the surfaces 51 and 55 until the cutting mechanism 40 and its jaw 44 is withdrawn to the position shown in Figs. 6 and 7. Then a change in the contour of the cam 60 presses the inner end of the piece 53 into contact with the shoulder provided therefor in the piece 56 and positively pushes the surface 55 to the right to squeeze the hot slug 41 a given amount, predetermined by the adjustment of the relative position of the interthreaded pieces 52 and 53. The result in the particular apparatus disclosed, is that the slug 41 is flattened to form a thick disc 41' (see Figs. 6 and 7), but the disc is not flattened to the extent that it will not easily fit into the forming die described later. This operation takes place when the cutting mechanism 40 is in its first position ready to receive the next portion from the end of the bar stock 20. The pre-pressing or squeezing of the slug 41 into the disc 41' materially expands the free outer surfaces of the slug 41 so that the oxide and scale which does not have the same coefficient of expansion as that of the metal in the slug or is not so plastic, will crack away from the deformed metal at the surface junction between it and the scale, and the scale will thus fall off through the passageway 69 provided therefor in the machine frame (see Fig. 12). Since the two end surfaces of the slug 41 have just been freshly cut from the hot stock 20, they contain substantially no oxide or scale because they were not exposed in the furnace 21. Therefore these two opposite clean surfaces of the slug 41 can be contacted between the parallel squeezing surfaces 51 and 55, in that they need not be deformed for the removal of scale. Thus, only the scale coated surfaces of the slug 41 are deformed and the resulting disc 41' is substantially free from scale on all of its surfaces.

The squeezing mechanism 50 is withdrawn by the action of cam 61 against its follower 70 mounted on lever 71 pivoted to the arm 65 at 72. The cam follower 70 is adjustably held into contact with the cam 61 by spring 73 located in the sleeve 74 threaded in the end of lever 71 opposite from that end which supports the cam follower 70. Thus, the pulling of the mechanism 50 to the left, through its slide bearings mounted in aligned projections 75 and 76 on the frame 66, causes the shoulder 77 on piece 53 to engage the inside of the threaded cap 58 and withdraw the surface 55 into the position shown in Figs. 9 and 12, so that the disc 41' is free to fall by its own weight on to the curved, crooked, or bent chute 80 to be conducted and guided under the pull of gravity on its own weight to the next part of the machine. This next part herein is located at right-angles to those parts already described and has the added advantage of making the machine as a whole more compact. The trough or chute 80 down which the disc 41' slides and rolls is provided with a slot 81, or other shaped apertures, to permit any more scale which is knocked off of the disc 41' to drop through into passageway 69 and not clog the chute 80. Also the slight drop of the disc 41' from its squeezed position between surfaces 51 and 55 to the chute 80 aids in jarring lose any scale which has not fallen off during the squeezing operation.

Before continuing with the description and after the description of the details of the adjustability of the pre-pressing mechanism, it should be noted that the operation of the retractable abutment 33 may also be operated and be adjustable in a similar manner to that disclosed for the mechanism 50 and may also be controlled by an additional cam follower 78 mounted against the cam 61 (see Fig. 3) in another angular position than that of the cam follower 70, in that the abutment 33 is extended when the mechanism 50 is retracted and vice versa.

The remaining part of this description is directed to the shaping and forming mechanism to produce a smooth sharp-edged scale-free nut blank which needs substantially only the after treatment of being internally threaded. Any known hot method of forming a nut or similar article from such a disc may be employed without departing from the scope of this invention, in that the disc is still hot and comparatively plastic and if it is operated upon immediately, substantially no scale or oxides will have time to form again on its surfaces before entering the shaping die or dies. Therefore, referring to Fig. 13, there is shown in vertical section a schematic view of a die feeding mechanism 90 which may be operated by a cam 91 mounted on cam shaft 63 and followed by a cam follower 92 mounted on lever 93 pivoted to the machine frame 66 at 94 and connected by a link 95 to a crank having lever arms 96 and 97 journalled in frame 66 and 98. The motion of these levers through the means of slot 100 in lever 97 and pin 101 fixed to the mechanism 90 and movable in slot 100, reciprocates the mechanism 90. The cam follower 92 may be maintained against the surface of the cam 91 by means of springs 102 connected between the levers and the frame.

In the particular die or press feeding mechanism 90 shown, there are provided two pushing fingers 103 and 104 to successively move the disc into two adjacent forming and finishing die positions. Both fingers 103 and 104 are fixed to a horizontally sliding head 105, and the first finger is pivotally mounted at 106 on a rigid extension 107 and maintained in position by a spring 108. This first finger 103 is thus resiliently mounted so that it may give way easily to the motion of the outer edge of the pressing die which removes the disc 41' from the finger and pushes it into the die, which die is of larger inside diameter than the outside diameter of the disc 41' carired by the finger, so that the disc 41' will fit into the counter-sunk portion of the die as previously stated. The end of the chute 80 is so designed that only one disc 41' at a time may drop onto the first leading finger 103 and when this finger is moved to the left it closes the lower open end of the chute 80 to prevent other discs from falling out. From the position shown in Fig. 13, which may correspond to the last of the preceeding disc forming operations as shown in Figs. 17 or 19, the hot disc 41' to be shaped is moved by the mechanism 90 supported by finger 103 into the first position shown in Fig. 14 wherein the disc 41' is placed in front of the opening 111 in the counter-sunk or concave portion of the nut forming or shaping mechanism 110. The reciprocating and projecting portion 112 of this die mechanism 110 comprises a heavy cross-head 114 which is reciprocated horizontally by a connecting link 115 between it and crank shaft 116 (see Fig. 3) which in the present machine is the main and primarily driven shaft.

This shaft 16 may be driven through speed reduction gears 117 and 118 and a safety clutch mechanism 119 (see Fig. 1); and may be directly connected through beveled gears 120 and 121 to the cam shaft 63, and this cam shaft may be then connected in turn through beveled gears 121 and 122 to the cam shaft 36, and this cam shaft 36 through mechanism 35 to the feeding mechanism, so that all the operations of the machine are in synchronism with each other and only a single source of driving energy is required. On the shaft 124 of the reduction gear 118 there may be provided a fly-wheel 125 to add inertia to the operation of the machine and particularly the shaping mechanism 110. Any suitable power source means may be employed for driving the machine, such as an electric motor, which may be geared to the drive shaft 124 or connected to the periphery of the fly-wheel 125.

Referring now specifially to Fig. 14, the disc 41' in front of the concave die 111 is now pushed from the finger 103 into the die 111 by the forward movement of the die portion 112. Continued pressure on the disc in the die by the projecting portion 112 pushes the ejector pin 130 back into its retracted position, and then the plastic metal in the hot disc 41' is pressed against the walls of the die to form the outside configuration of a hexagonal nut (see Fig. 15) as well as a partly pushed hole through its center by means of pin 131 of the projecting movable die portion 112, as shown in Fig. 16. The first shaping dies 111 and 112 have now completed their part of forming a nut from the disc 41' and are withdrawn so that the feeding mechanism may be retracted again into the position shown in Figs. 13 and 17 and the upwardly extending portion of the finger 104 will not collide with the portion 112 of the die. The resulting nut-shaped piece 132 is then pushed from the die by means of the pin 130, which may be operated by a cam 133 mounted on cam shaft 36. As the piece 132 is removed from the die 111 it is placed onto the second feeding finger 104 which is now in the position shown in Figs. 17 and 19 and simultaneously a cooling fluid, such as water, may be forced out through the holes 134 in ejector 130 (see Fig. 14) to cool the inside of the die 111. This cooling liquid may be introduced into the duct 134 through port 135 in the side of its sliding operating member 136 when this port is opposite an aligned port in the frame 66 of the machine, which occurs only when the member 136 is in its extended position as shown in Figs. 14 and 19. Thereby, the member 136 with its port 135 acts as a valve for controlling when the water is to be injected into the die for cooling and washing out the die 111.

From the position shown in Fig. 19 while the press mechanism 114 is retracted, the feeding mechanism 90 is again operated so that the finger 104 moves the piece 132 into alignment with the punching mechanism 140, which also may be mounted at the end of the member 114 and operated at the same time as the first die forming mechanism. This punching mechanism completes the hole through the center of the piece 132 by sizing the hole and punching out the remaining button 141 against the die 142, so that the button falls down through passage way 143 and the completed nut blank 144 is pulled off the punch 140 by the stationary apertured plate 145 (see Figs. 16, 17 and 18) as the punch is retracted, and then falls into another passage 146 for collection and later finishing, such as threading. Since both fingers 103 and 104 are connected to the same feeding mechanism 90, they are operated together so that when one disc is being fed to the shaping die 111, the disc which has just been shaped therein is being fed to the punching mechanism 140. If the completely formed nut blank 144 happens to rest on the retracting finger 104 when it is pulled off the punch by plate 145, it will be pushed off the finger 104 by the following piece 132 when it is pushed out of the die 111 by the ejecting mechanism 130, so that the completed nut will fall in the desired passage or hopper with the other completed nuts.

Although the foregoing description has been limited to a specific apparatus for the continuous production of nuts by the hot method from bar stock, it is within the scope of this invention to change the dies and adjustments of the machine disclosed to produce other forms of nuts, such as castle-nuts, square-nuts, round-headed nuts, etc., rivets, bolts, washers, and other similar types of metallic articles from heated bar or strip stock, which stock may be fed through the furnace either in cut lengths or from a reel. Also, the number of formation operations may be changed and the mechanisms for performing the different operations may be divided between two or more different machines, as desired, without departing from the steps of the process of this invention. However, the particular combination of operations into one machine as herein described has material advantages as to compactness, efficiency, adaptability and synchronization of the movements. Furthermore the compactness and speed at which the disclosed unitary machine can operate, permits a lower temperature to be used in the furnace to maintain sufficient heat in the slugs to last until they are shaped, which is an additional advantage in the saving of heat energy input in the process.

The trough or chute means 80 for conveying the squeezed scale-free slugs to the forming press or die may be made of screen wire or may be provided with other types of holes, instead of the slot 81, for permitting the scale to fall through it, and its bend may take other forms than that of merely 90° as shown, without departing from the scope of this invention. It is desirable, however, that this chute is not straight in that its use in knocking the edges of the discs 41' as they fall down along it to remove scale would be lessened.

While there is described above the principles of this invention in connection with specific apparatus, it is to be clearly understood that this description is made only by way of example and not as a limitation to the scope of this invention.

The apparatus and machine previously claimed in this application are now claimed in the applicant's divisional application Ser. No. 252,097, filed September 27, 1951.

What is claimed is:

1. A process for producing metallic articles from hot slugs having freshly-cut scale-free ends but having on their peripheral surface scale formed on them while being heated, and shaping said articles from said slugs under pressure while hot in a die, the steps comprising: pre-pressing each of said slugs endwise while holding them by their freshly-cut scale-free ends with their peripheral surfaces unconfined for descaling to bulge the slugs and crack said scale on their peripheral surfaces, knocking off and separating the scale cracked from said surfaces from said slugs, transferring each substantially scale-free slug into said die, and then pressing each of the scale-free slugs in said die.

2. A process for producing under pressure in a die definitely shaped metallic articles from a bar of hot metal stock, comprising the steps of: cutting slugs from one end of said hot metal bar which are substantially equal in weight to the final articles to produce slugs having freshly-cut scale-free ends, immediately squeezing said slugs between their freshly-cut scale-free ends with their sides unconfined for descaling to bulge their sides to crack and loosen the scale formed thereon during the heating of said bar, transferring the bulged substantially scale-free slugs into said die, and pressing said scale-free slugs in said die to form said articles.

3. A process for producing under pressure in a die definitely shaped metallic articles from a bar of hot metal stock, comprising the steps of: cutting successive slugs from one end of said hot bar to produce slugs having freshly-cut scale-free ends, immediately squeezing said slugs between their freshly-cut scale-free ends with their sides unconfined for descaling to bulge their sides to crack and loosen the scale thereon, permitting the squeezed slugs to fall freely into and roll down a bent path to knock off any remaining scale, and then pressing said scale-free slugs successively in said die to form said articles.

4. A process for producing machine nuts from bar stock comprising: heating said stock to red heat, successively cutting slugs from one end of said hot stock to provide slugs having freshly-cut scale-free ends, immediately as said slugs are cut from the bar stock squeezing them between their freshly cut scale-free ends with their sides unconfined for descaling to bulge their sides and crack and loosen the scale thereon formed while the bar of stock was being heated, immediately thereafter dropping and then guiding the squeezed slugs freely along a crooked path to knock off any remaining scale, transferring the resulting scale-free slugs in succession into a forming die, pressing said scale-free slugs in said die to form the outside of said nuts, and then punching the holes through the centers of the formed slugs.

5. In the manufacture of definitely shaped metallic articles from bar metal stock in which metal bars are heated to a red heat plastic state in a heating zone and acquire a surface coating of hard oxide scale, the successive steps comprising feeding a hot metal bar endwise horizontally from said heating zone by means of a pair of feed rolls in which the bar is held, operating the feed rolls to advance one end of the bar endwise horizontally to a slug cutting station, successively cutting slugs from the advanced end of the hot metal bar to produce plastic metal slugs having hard scale on their peripheral surfaces and freshly cut scale-free ends, transferring each slug directly to a descaling station as it is cut from the end of the bar while maintaining its axis horizontal, immediately squeezing each slug at the descaling station while maintaining its axis horizontal and its peripheral surface free for descaling, the squeezing of each slug being effected by applying pressure to its opposite freshly-cut scale-free ends sufficient to bulge the peripheral surface of the slug and thereby crack-off the scale from said surface, thereafter transferring the scale-free hot plastic metal slug into a die cavity, and pressing the slug in the die cavity to form a definitely shaped metallic article.

6. In the manufacture of definitely shaped metallic articles from bar metal stock in which metal bars are heated to red heat in a heating zone and acquire a surface coating of oxide scale, the successive steps comprising feeding a hot metal bar endwise from said heating zone by means of a pair of feed rolls having grooves facing each other and engaging the bar, operating the feed rolls to advance one end of the bar to a slug cutting station, gripping the bar adjacent to the end part to be cut-off and cutting a slug from the end of the hot metal bar to produce slugs having freshly cut scale-free end faces, moving each slug at an angle to the axis of the bar as the slug is cut from the end of the bar, the cut slug being moved directly to a descaling station, immediately squeezing each slug at the descaling station by applying pressure laterally to its freshly-cut scale-free end faces sufficient to bulge the peripheral surface of the slug and thereby crack-off the scale from said surface, said slug being held solely by said applied pressure during the scale-cracking operation, immediately transferring the scale-free hot slug into a die, and pressing the slug in the die to form a definitely shaped metallic article.

7. In the manufacture of nuts having a predetermined shape from bar metal stock in which a metal bar is heated to a red heat plastic state and acquires a coating of hard scale, the successive steps comprising feeding the hot metal bar to advance one end thereof to a blank cutting station, successively cutting blanks of predetermined length from the advanced end of the hot metal bar to produce plastic metal blanks having freshly cut scale-free end faces and hard scale on their peripheral surfaces, transferring each blank as it is cut from the end of the bar to a blank squeezing station, squeezing each blank at said station by applying pressure to its freshly-cut scale free end faces sufficient to bulge the peripheral surface of the blank to crack off the scale therefrom and reduce it to a thickness approximating that of the nut to be formed therefrom, maintaining the peripheral surface of the blank free for descaling during the squeezing operation, transferring the scale-free blank while hot and plastic from said station into a polygonal die, applying pressure to the end faces of the blank in the die to shape the end faces of the blank and simultaneously piercing the blank axially from one end face thereby forcing the plastic metal of the blank to assume the shape of the die and providing a pierced hole pletely therethrough, removing the pierced blank from the die, and immediately thereafter cutting an axial hole of desired size through the blank.

8. The manufacture of definitely shaped metallic articles as claimed in claim 6, in which the bulged slug at the descaling station is dropped onto a hard surface and rolled down an inclined surface to complete the removal of scale from its peripheral surface prior to transfer into the die, whereby appreciable erosion of the die by scale is prevented.

9. In the manufacture of definitely-shaped metallic articles from bar metal stock in which round metal bars are heated to red heat in a heating zone and acquire a surface coating of oxide scale, the rapidly successive steps comprising feeding a hot round metal bar horizontally endwise from said heating zone to advance one end of the bar to a slug cutting station, cutting slugs of predetermined length from said one end of the hot metal bar to produce slugs having freshly-cut scale-free end faces, moving each slug from the slug cutting station with its axis horizontal as the slugs are cut from said end of the bar directly to a descaling station, immediately squeezing each slug at the descaling station by applying pressure to its freshly-cut scale-free end faces sufficient to bulge the peripheral surface of the slug and thereby crack-off the scale from said surface, supporting said slug during said squeezing and bulging operation solely by the pressure applied to its freshly-cut scale-free end faces to leave its periphery free for the scale to crack off, releasing the resulting bulged slug at the descaling station, transferring the released scale-free hot slug into a forming die, and pressing the slug in the forming die to form a definitely-shaped metallic article.

10. A process for producing definitely shaped metallic articles from hot plastic metal slugs having two freshly-cut scale-free opposite sides which are shaped under pressure in a die cavity, comprising: separately squeezing said slugs at said freshly-cut scale-free opposite sides with their scale covered surface unconfined for descaling to bulge the slugs to a breadth less than that of said die cavity and crack off scale from said slugs, freely guiding said squeezed slugs downwardly along a definite path under their own weight to knock off any remaining scale, transferring the resulting scale-free slugs in succession into the die cavity, and then pressing said scale-free slugs in said die cavity to form said articles.

11. In the manufacture of definitely shaped metallic articles from bar metal stock, the successive steps of heating the bar stock to a red hot plastic state, successively cutting slugs from an end of the hot metal bar to produce slugs having freshly cut scale-free ends with scale on their peripheral surfaces, squeezing each slug immediately after it is cut from the bar while leaving its peripheral surface free for the scale to crack off by applying pressure to its opposite freshly-cut scale-free ends sufficient to bulge the peripheral surface of the slug and thereby crack-off the scale from said surface, thereafter transferring the scale-free hot slug into a die, and pressing the slug in the die to form a definitely shaped metallic article.

References Cited in the file of this patent

UNITED STATES PATENTS

| Number | Name | Date |
|---|---|---|
| 261,022 | Morgan | July 11, 1882 |
| 301,433 | Clark | July 1, 1884 |
| 837,435 | Truebe | Dec. 4, 1906 |
| 1,417,806 | Lapotterie | May 30, 1922 |
| 1,636,955 | Golding | July 26, 1927 |
| 1,693,664 | Petitjean | Dec. 4, 1928 |
| 1,709,111 | Black | Apr. 16, 1929 |
| 1,755,325 | Kinney | Apr. 22, 1930 |
| 1,815,107 | Lamond | July 21, 1931 |
| 1,832,168 | Wilcox | Nov. 17, 1931 |
| 2,077,519 | Frayer | Apr. 20, 1937 |
| 2,338,652 | Lefere | Jan. 4, 1944 |